United States Patent [19]

Bell

[11] 4,391,737

[45] Jul. 5, 1983

[54] CATALYSTS FOR RING-OPENING COPOLYMERIZATION OF CYCLOOLEFINS

[75] Inventor: Anthony J. Bell, Stow, Ohio

[73] Assignee: The Goodyear Tire & Rubber Company, Akron, Ohio

[21] Appl. No.: 272,635

[22] Filed: Jun. 11, 1981

[51] Int. Cl.$^3$ ............................................... C08F 4/62
[52] U.S. Cl. .................. 252/429 B; 526/142
[58] Field of Search ...................................... 252/429 B

[56] References Cited

U.S. PATENT DOCUMENTS

| | | | |
|---|---|---|---|
| 3,492,245 | 1/1970 | Calderon et al. | 252/429 B |
| 3,535,401 | 10/1970 | Calderon et al. | 252/429 B X |
| 3,784,630 | 1/1974 | Maly et al. | 252/429 B X |
| 3,784,631 | 1/1974 | Menapace et al. | 252/429 B X |
| 3,966,637 | 6/1976 | Witte et al. | 252/429 B |

Primary Examiner—Patrick Garvin
Attorney, Agent, or Firm—Alvin T. Rockhill; Daniel J. Hudak

[57] ABSTRACT

A catalyst for the ring-opening copolymerization of a hexachlorocyclopentadiene-1,5-cyclooctadiene adduct and a cycloolefin, other than cyclohexene, having 4 to 12 carbon atoms and containing at least one non-conjugated vinylene double bond. Owing to modification by oxy bidentate-type ligands, the chlorotungsten catalyst system affords a more favorable comonomer reactivity ratio and is thus utilized. The catalyst comprises a compound of (a) the reaction product of tungsten hexachloride and a 1,2- or 1,3- dioxy compound; and a compound (b) having the formula R-AlCl$_2$ where R is an alkyl group having from 2 to 5 carbon atoms.

4 Claims, No Drawings

CATALYSTS FOR RING-OPENING COPOLYMERIZATION OF CYCLOOLEFINS

TECHNICAL FIELD

The present invention relates to composition of matter and use of a catalyst system for the ring-opening copolymerizations of a hexachloro-cyclopentadiene-1,5-cyclooctadiene Diels-Alder adduct, see (I), hereinafter referred to as Hex COD, and a cycloolefin other than cyclohexene which contains 4 to 12 carbon atoms and possesses at least one non-conjugated vinylene —CH=CH— double bond.

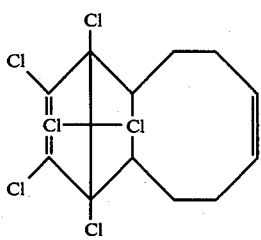
(I)

The oxy bidentate-type ligand modified catalyst system described herein more effectively incorporates the Hex COD monomer into the polymer system during the early stages of the polymerization, relative to the same copolymerization initiated by the prior art chlorotungsten/organoaluminum cocatalyst system. That is, a more favorable comonomer reactivity ratio is achieved by the catalyst of this invention.

BACKGROUND ART

Ring-opening polymerization refers to a process whereby cycloolefins, in the presence of an olefin metathesis catalyst, form high molecular weight polyalkenamers.

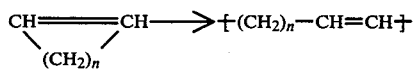

It should be noted that in polyalkenamers resulting from the ring-opening polymerization of cycloolefins, the repeating polymer segments contain essentially the same number of carbon atoms and double bonds as the cyloolefin polymerized. This is to be contrasted with addition polymers prepared from acyclic olefins and diolefins, wherein the polymer segments contain one less double bond than the employed olefin or diolefin monomer contained.

The present invention is specific for ring-opening copolymerizations of Hex COD (I) and a cycloolefin comonomer as defined above. Representative of such cycloolefins are cyclopentene, cyclooctene and 1,5-cyclooctadiene. Owing to the possession of chlorine atoms, copolymers prepared with Hex COD (I) possess oil-, chemical-, and flame-resistant properties which are useful in numerous applications and are described in an earlier patent, U.S. Pat. No. 3,634,374, granted Jan. 11, 1972.

Copolymerization of Hex COD (I) can be initiated by conventional tungsten-based olefin metathesis catalyst system, as set forth in U.S. Pat. No. 3,597,403 granted Aug. 3, 1971; U.S. Pat. No. 3,634,374 granted Jan. 11, 1972; U.S. Pat. No. 3,722,255 granted Nov. 13, 1973; U.S. Pat. No. 3,867,361 granted Feb. 18, 1975; U.S. Pat. No. 3,932,373 granted Jan. 13, 1976; and U.S. Pat. No. 3,943,116 granted Mar. 9, 1976. However, with the use of such prior art catalysts, the copolymerizations are marked by the phenomenon that by comparison with the charged comonomer ratio, only a very small level of the chlorine-containing Hex COD comonomer is incorporated into the copolymer during the initial and early stages of the polymerization, owing to its relatively lower reactivity. Hence, it is only when the concentration of the cycloolefin comonomer is substantially diminished during the polymerization that the chlorine content of the copolymer gradually approaches the theoretical level based on the initial comonomer charge. One of the primary disadvantages of this feature is that the chlorine-content desired for a particular copolymer is not achieved when less than quantitative (100 percent) yields of the copolymer are obtained.

DISCLOSURE OF INVENTION

It is therefore an object of the present invention that the catalyst system described in this specification render the chlorine-containing Hex COD monomer more competitive in the copolymerizations. That is, its use affords a relatively more favorable Hex COD/cycloolefin comonomer reactivity ratio in that during the early stages of the polymerization, as well as during the latter stages, the chlorine content of the copolymer more closely approaches that expected from the comonomer charge employed.

In general, a method for copolymerizing hexachlorocyclopentadiene-1,5-cyclooctadiene and a cycloolefin, other than cyclohexene, having from 4 to 12 carbon atoms, comprises the steps of: utilizing a catalyst consisting of (a) the reaction product of from about 0.9 to about 1.5 moles of tungsten hexachloride and one mole of a 1,2- or 1,3-dioxy compound selected from the group consisting of 2,4-pentadione, 2-formylphenol, 1,2-dihydroxybenzene, 1,3-diphenyl-1,3-propanedione, and (b) a compound having the formula $R-AlCl_2$ wherein R is an alkyl group having from 2 to 5 carbon atoms, the molar ratio of (b) to (a) ranging from about 2 to about 6, and carrying out said copolymerization at a temperature of from about minus 10 to about 40° C.

In general, a catalyst for the ring-opening copolymerization of Hex COD and a cycloolefin having from 4 to 12 carbon atoms other than cyclohexene, said cycloolefin containing at least one non-conjugated double bond, comprising: a compound of (a) the reaction product of tungsten hexachloride and a 1,2- or 1,3-dioxy compound selected from the group consisting of 2,4-pentadione, 2-formylphenol, 1,2-dihydroxybenzene, 1,3-diphenyl-1,3-propanedione, and combinations thereof; and (b) a compound having the formula $R-AlCl_2$ wherein R is an alkyl group having from 2 to 5 carbon atoms, the molar ratio of (b) to (a) ranging from about 2 to about 6, the amount of said tungsten chloride to said dioxy compound ranging from about 0.9 moles to about 1.5 moles.

BEST MODE FOR CARRYING OUT THE INVENTION

The present catalyst system comprises (A) the reaction product of tungsten hexachloride ($WCl_6$) and an approximately equimolar amount of a 1,2- or 1,3-dioxy compound selected from the group consisting of 2,4-pentadione, 2-formylphenol, 1,2-dihydroxybenzene (catechol), and 1,3-diphenyl-1,3-propanedione; and (B) an organoaluminum compound of the formula R-AlCl$_2$ wherein R represents an alkyl group having from 2 through 5 carbon atoms. Representative of such monoalkylaluminum dichlorides are ethylaluminum dichloride, n-propylaluminum dichloride, isobutylaluminum dichloride, and the like.

That the more favorable Hex COD/cycloolefin comonomer reactivity ratio obtained with WCl$_6$ moldified with a dioxy compound, i.e., compound (A), is not due simply to the number of oxygen atoms attached to the central tungsten atom, can be readily ascertained from Table I where the present catalyst system is compared with the typical prior art tungsten catalyst likewise possessing two oxygen atoms, but from two separate ligands.

No definite explanation is known for the improved comonomer reactivity afforded by the present catalyst system, but it is interesting to note that a basic structural feature of the 1,2- and 1,3-dioxy compounds which can serve as modifiers of WCl$_6$ to give the (A) component, is that each of these can conceivably act as a bidendate leading to one of a number of structures in which the two oxygen atoms of the bidentate ligand can either both be bonded to the tungsten atom, or one bonded and the other coordinated with the tungsten atom as illustrated:

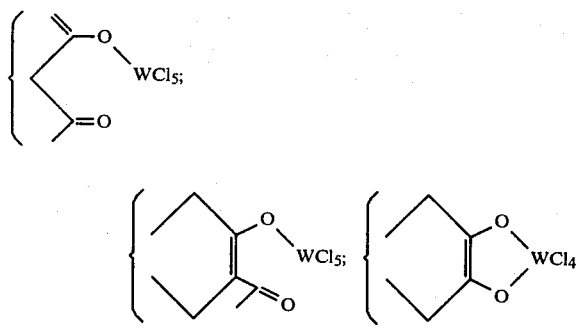

Hence, the chelation of the central tungsten atom may be a critical factor in the unique effect that this catalyst has on the comonomer reactivity in Hex COD copolymerizations.

The (A) component of the catalyst system is prepared by mixing from about 0.9 to about 1.5 moles, or preferably an equimolar amount of WCl$_6$ to one of the above-defined dioxy modifiers at ambient temperatures in an inert solvent such as benzene, chlorobenzene, or cyclohexane, and bubbling an inert gas such as nitrogen, etc., through the resulting solution to remove all traces of the hydrogen chloride gaseous by-product.

The catalysts employed in this invention are prepared by mixing the components by known techniques. Thus, the catalysts may be prepared by "preformed" or in situ techniques. In the "preformed" method, the catalyst components are mixed together prior to exposure of any of the catalyst components to the cyclic monomers to be used in the polymerization reaction. In the in situ method, the catalyst components are added separately to the cyclic monomers in the polymerization mixture. In the practice of this invention, the latter method is preferred, and in the preferred order wherein the tungsten component (A) is added first and, then, the aluminum component (B).

It has been found that good results are obtained in the practice of this invention when the molar relationship of the aluminum component (B) to the tungsten component (A) of the catalyst system is from 2/1 to 6/1. More preferred are (B)/(A) molar ratios of between 3.5/1 to 4.5/1. The amount of tungsten catalyst employed is 1 gram of the tungsten hexachloride before modification to from about 1,800 grams to about 2,500 grams of the comonomers.

With respect to the cycloolefin comonomers, compounds which can be utilized include cyclopentene, cyclooctene, 1,5,9-cyclododecatriene, and 1,5-cyclooctadiene. The preferred cycloolefins are cyclopentene and 1,5-cyclooctadiene.

The temperature range in which the polymerization can be carried out is from about minus 10° C. to about 40° C., with from about 0° C. to about 10° C. being preferred. Although atmospheric pressure is generally utilized, the reaction may be carried out in a slight vacuum or under slight pressure.

The copolymers of the present invention are particularly suited for use as in hoses, brake linings, motor mounts, and other rubber items wherein good solvent and flame resistance is desired.

The following examples are set forth to further illustrate the practice of this invention.

EXAMPLE I

A 55 percent solution by weight of Hex COD and cyclopentene in cyclohexane was passed through a column packed with silica gel and alumina. Previously dried four ounce bottles were each charged with 80 ml of solution, (that is, 44 grams of comonomers), and sparged with nitrogen for 15 seconds before closing with a self-sealing cap. The bottles were cooled to 0° C. Using a syringe, 0.5 ml of a 0.05 M catalyst solution (A) set forth in Table I, and 0.45 ml of 0.2 M EADC (ethylaluminum dichloride) solution were injected respectively into the bottle through the self-sealing caps. The reaction temperatures were maintained at 0° C. to 5° C.

After 1 to 6 hours, the polymerizations were terminated by injecting 1 ml of isopropylalcohol into the bottle and shaking the viscous contents. The polymer products were isolated through coagulation, by pouring the reaction mixture into isopropylalcohol solvent. The polymers were dried under vacuum at 55°–65° C., and obtained in 97 to 100 percent yields.

TABLE I

| OXY-BIDENDATE CATALYSTS | % CONVERSION TO POLYMER | % Cl FOUND | | | % Cl after COMPLETE CONVERSION |
|---|---|---|---|---|---|
| | | OXY-BIDENTATE CATALYST | PHENOXY WCl$_5$ | (EtO)$_2$WCl$_4$ | |
| 1. (2,4-pentanedione)WCl$_5$ | 3 | 10 | (2) | (—) | 36 |
|  | 20 | 29 | (9) | (7) | 36 |
| 2. (2-formylphenoxy)WCl$_5$ | 16 | 18 | (7) | (4.8) | 36 |
|  | 42 | 24 | (18) | (15) | 36 |
| 3. (1,2-dihydroxybenzene)WCl$_4$ | 6 | 29 | (3) | (—) | 36 |

TABLE I-continued

| OXY-BIDENDATE CATALYSTS | % CONVERSION TO POLYMER | % Cl FOUND | | | % Cl after COMPLETE CONVERSION |
| --- | --- | --- | --- | --- | --- |
| | | OXY-BIDENTATE CATALYST | PHENOXY WCl$_5$ | (EtO)$_2$WCl$_4$ | |
| | 20 | 30.5 | (9) | (7) | 36 |

From the chlorine contents obtained from the copolymers at various conversions (Table I), it can be readily seen that a significantly higher ratio of the Hex COD chlorine-containing monomer to comonomer is obtained during the earlier stages of the copolymerizations when the present catalyst system is employed, compared with those obtained using the prior art catalysts.

While in accordance with the patent statutes, the preferred embodiment and the best mode of the invention have been set forth in detail, the scope of the invention is to be measured by the attached claims.

What is claimed is:

1. A catalyst for a ring-opening copolymerization, consisting of:
    a compound of (a) the reaction product of tungsten hexachloride and a 1,2- or 1,3-dioxy compound selected from the group consisting of 2,4-pentadione, 2-formylphenol, 1,3-diphenyl-1,3-propanedione, said reaction product forming a bidentate ligand; and a compound (b) having the formula R-AlCl$_2$ wherein R is an alkyl group having from 2 to 5 carbon atoms, the molar ratio of (b) to (a) ranging from about 2 to about 6, the amount of said tungsten chloride to said dioxy compound ranging from 0.9 moles to about 1.5 moles,
    said bidentate ligand causing a more favorable comonomer reactivity ratio in the ring-opening copolymerization of Hex COD monomer and a cycloolefin monomer other than cyclohexene, said cycloolefin having from 4 to 12 carbon atoms and at least one non-conjugated double bond.

2. A catalyst according to claim 1, wherein said organoaluminum compound is selected from the group consisting of ethylaluminum dichloride, isobutylaluminum dichloride, n-propylaluminum dichloride.

3. A catalyst according to claim 2, wherein said molar ratio of (b) to (a) ranges from about 3.5 to about 4.5.

4. A catalyst according to claim 3, wherein said dioxy compound is 2,4-pentadione, and wherein said organoaluminum compound is ethylaluminum dichloride.

* * * * *

UNITED STATES PATENT OFFICE
CERTIFICATE OF CORRECTION

PATENT NO. : 4,391,737
DATED : July 5, 1983
INVENTOR(S) : Anthony J. Bell

It is certified that error appears in the above-identified patent and that said Letters Patent are hereby corrected as shown below:

In Column 1, line 65, delete --system,-- and insert therefor "systems,".

In Column 3, line 10, delete --moldified-- and insert therefor "modified".

Signed and Sealed this

Eleventh Day of September 1984

[SEAL]

Attest:

*Attesting Officer*

GERALD J. MOSSINGHOFF
*Commissioner of Patents and Trademarks*